United States Patent Office 3,370,957
Patented Feb. 27, 1968

3,370,957
ANTIFUNGAL COMPOSITIONS AND METHODS FOR THEIR USE
Joseph R. Wagner, Moraga, Calif., Thomas W. Humphreys, London, Ontario, Canada, and Herbert H. Royse, Oakdale, Calif., assignors to Merck & Co., Inc., Rahway, N.J., a corporation of New Jersey
No Drawing. Continuation-in-part of application Ser. No. 282,551, May 23, 1963. This application May 12, 1964, Ser. No. 366,883
19 Claims. (Cl. 99—90)

This application is a continuation-in-part of our pending application, Wagner, Humphreys and Royse, Serial No. 282,551, filed May 23, 1963, now abandoned.

This invention relates to compounds active as fungicides and to methods for their use. More specifically, this invention relates to 2-substituted benzimidazoles effective as fungicides. Still more particularly, this invention is directed to novel fungicides comprising compounds of the formula 2-R-benzimidazole, where R is a thiazolyl, isothiazolyl or thiadiazolyl radical, to compositions containing such compounds and to methods of killing fungi or controlling their growth by the use of such compositions and compounds.

Fields of technology adversely affected by the lack of effective fungicides are many and include the paint, wood, textile, cosmetic, leather, tobacco, fur, rope, paper, pulp, plastics, fuel, rubber and food industries. Fungicidal agents or materials may find use in medical therapy such as the treatment of mycotic infections of man and animals where the skin, hair, nails and other areas of the body are infected. Fungicides are also utilized for agricultural application, for instance in preventing or minimizing fungus growth on plants, fruits, seeds or soil. In addition, fungicides are useful in preventing Mycotoxicosis, an animal disease which may cause internal lesions, tumors and death and which results from ingestion of food contaminated by toxins of fungal origin. We have discovered that certain 2-substituted benzimidazoles are effective in controlling this undesired fungus growth.

Although many antifungal agents have been described and used heretofore in an effort to control fungi, none are entirely satisfactory and continued losses resulting from fungal attack make the problem of control a serious and lasting one. The number of fungicides practically useful in combatting fungal growth have been small and only in a few cases have synthetic organic chemicals been found applicable.

It is an object of this invention to provide novel antifungal agents. It is a further object of this invention to provide new and improved methods of controlling the growth of fungi. Another object of this invention is to provide compositions useful in the control of fungi in or on food, plants and animals. It is still a further object of this invention to provide a method for controlling and killing fungi with synthetic organic chemicals. Further objects and advantages will become apparent from the following description of the invention.

As used in the description of our invention, the expressions "fungicide" and "fungicidal" are intended to encompass control of fungi broadly so as to include the killing of fungi as well as the inhibiting of the growth of fungi.

According to the present invention it has now been found that certain 2-heterocyclic benzimidazoles are highly effective antifungal agents. It will be appreciated by those skilled in the art that not all of the compounds defined hereinbelow have exactly the same degree of antifungal activity and it should also be understood that a particular compound of the invention will vary somewhat in activity depending upon the species of fungus subjected to its action.

Generally, the invention comprises antifungal compositions where an active ingredient has the general formula

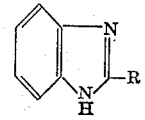

(I)

wherein R represents a heterocyclic radical containing nitrogen and sulfur as the hetero atoms. In addition the 2-heterocyclic benzimidazole antifungal agents described herein may, if desired, be further substituted on the benzimidazole nucleus, and particularly at the 1, 5 and/or 6 position of such nucleus. The preferred substituents are conveniently described by reference to the formula

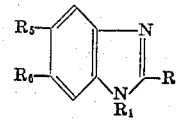

(II)

wherein R is thiazolyl, isothiazolyl, or thiadiazolyl; $R_1$ is hydrogen, loweralkyl, acyl, alkenyl, aralkyl or aralkenyl; and $R_5$ and $R_6$ are hydrogen, phenoxy, loweralkoxy, loweralkyl, halo, amino, loweralkylamino, diloweralkylamino, imidazolyl, thiazolyl, isothiazolyl, thiadiazolyl, thienyl, furyl, pyrryl, naphthyl, phenyl, halophenyl, loweralkylphenyl, loweralkoxyphenyl, loweralkylthiophenyl, loweralkylaminophenyl or diloweralkylaminophenyl.

According to a still further aspect of the invention, the heterocyclic group at the 2-position may be further substituted by, for instance, a loweralkyl group.

As illustrative of the compounds within the scope of this invention which are particularly effective as antifungal agents, there may be mentioned:

2-(4'-thiazolyl) benzimidazole,
2-[3'-(1',2',5'-thiadiazolyl]] benzimidazole
2-(4'-thiazolyl)-5-methoxy benzimidazole,
2-(4'-thiazolyl)-5-phenoxy benzimidazole hydrochloride,
2-(2'-methyl-4'-thiazolyl) benzimidazole,
2-[4'-(1',2',3'-thiadiazolyl)] benzimidazole,
1-acetyl-2-(4'-thiazolyl)-5-phenyl benzimidazole,
2-(4'-isothiazolyl) benzimidazole,
2-(4'-thiazolyl)-6-fluoro benzimidazole,
2-(4'-thiazolyl)-5-amino benzimidazole,
2-(2'-thiazolyl)-5-(1'-imidazolyl) benzimidazole,
2-(4'-isothiazolyl)-5-chlorobenzimidazole,
2-(4'-thiazolyl)-5-phenyl benzimidazole,
2-[4'-(1',2',3'-thiadazolyl)]-5-(4'-tolyl) benzimidazole,
1-acetyl-2-(2'-thiazolyl)-5-phenyl benzimidazole,
1-methyl-2-(2'-isothiazolyl)-5-(2' - methoxyphenyl) benzimidazole,
2-(4'-isothiazolyl)-5-furyl benzimidazole,
2-(4'-thiazolyl)-5-(4'-fluorophenyl) benzimidazole hydrochloride,
2-(4'-thiazolyl)-5-bromo benzimidazole,
2-(4'-thiazolyl)-5-chloro benzimidazole,
2-(2'-thiazolyl)-5-methoxy benzimidazole,
2-(4'-thiazolyl)-5-(2'-fluorophenyl) benzimidazole hydrochloride,
2-[3'-(1',2',5'-thiadiazolyl)]-5-methylthio benzimidazole,
2-(4'-thiazolyl)-5,6-difluoro benzimidazole,
1-benzoyl-2-(4'-thiazolyl) benzimidazole,
2-(2'-thiazolyl)-5-(2'-pyrryl) benzimidazole,
1-methyl-2-(4'-isothiazolyl) benzimidazole hydrochloride,
2-(4'-thiazolyl)-5-phenoxy benzimidazole, 2-[3'-(1',2',5'-thiadiazolyl)]-5-methoxy benzimidazole,
1-ethyl-2-(4'-thiazolyl)-5-(2'-thiazolyl) benzimidazole,
1-acetyl-2-[3'-(1',2',5'-thiadiazolyl)]-5-(2'-furyl) benzimidazole,
2-(4'-thiazolyl)-4-fluoro benzimidazole hydrochloride,
2-(2'-thiazolyl) benzimidazole, and
1-acetyl-2-(4'-thiazolyl) benzimidazole.

The 2-substituted benzimidazoles of the invention are effective in controlling the growth of Aspergillus species, for example *A. niger, A. flavus, A. fumigatus, A. oryzae, A. luchensis, A. versicolor, A. sydowi, A. nidulans, A. flaucus* and *A. terreus*, Penicillium species, for example *P. notatum, P. roqueforti, P. chrysogenum, P. oxalicum, P. spinulosum, P. martensii, P. citrinium, P. digitatum, P. expansum, P. italicum, P. cyclopium*, and *P. funiculosum*, Neurospora species such as *N. sitophila*, Phoma species such as *P. terrestrius*, Rhizopus species, Alternaria species such as *A. solani*, Chaetomium species such as *C. globosum*, Chaetomicum species, for example *C. clivaceum*, and Monilia species such as *M. sitophila* and *M. nigra*. The above fungi may be found on fresh, preserved or frozen foods, such as cheese, cereals, grains, meats, fish, poultry, fats and oils, fruits, vegetables, baked goods, syrups, confections and the like, or they may be found on cosmetics, leather, electrical insulation, textiles, and numerous other materials capable of supporting their growth.

The compounds of this invention may be employed in treatment of plants, soils, fruits, seeds, fur, wood and the like. The fungicidal effectiveness of these compounds has been demonstrated against soil fungi, such as *Rhizoctonia solani, Fusarium solani*, and *Pythium ultimum*, plant fungi, for instance *Erysiphe polygoni* and *Alternaria solani* as well as against saprophytes known to attack wood, pulp and lumber such as *Lenzites trabea* and *Ceratocystis pilifera* and the fungus *Pullularia pullulans* which attacks paint.

The 2-R-benzimidazoles of this invention have also demonstrated their effectiveness against pathogenic fungi such as Trichophyton species, for example *T. mentagrophytes, T. rubrum*, and *T. gypseum*, Microsporum species such as *M. audouini* and *M. gypseum*, Cryptococcus species such as *C. neoformans*, Hormodendrum species such as *H. pedrosoi*, and Geotrichum species.

It should be understood that the compounds may be utilized in diverse formulations, solid, including finely divided powders and granular materials as well as liquid, such as solutions, emulsions, suspensions, concentrates, emulsifiable concentrate, slurries and the like, depending upon the application intended and the formulation media desired.

Thus it will be appreciated that compounds of this invention may be employed to form fungicidally active compositions containing such compounds as essentially active ingredients thereof, which compositions may also include finely divided dry or liquid diluents, extenders, fillers, conditioners and excipients, including various clays, diatomaceous earth, talc, and the like, or water and various organic liquids such as lower alkanols, for example ethanol and isopropanol, or kerosene, benzene, toluene and other petroleum distillate fractions or mixtures thereof.

In general, the compounds of this invention have been found effective in combatting fungi which attack and are an annoyance to humans. Fungus infections of man can be divided into two large groups (1) the superficial mycoses in which the parasites invade only the keratin layer of skin or its appendages, and (2) the deep mycoses in which various totally unrelated fungi infect the deeper organs of the body. The compounds of Formula II above have been found particularly effective against the superficial mycoses.

The clinical classification of the superficial mycoses is based on the site or structure of the body involved and not on the organism causing the infection. Among the common terms used are *Tinea capitis*, also commonly known as ringworm of the scalp; *Tinea barbae*, or ringworm of the beard; *Tinea corporis* (*Tinea circinata*), which refers to tinea of the nonhairy, nonintertriginous areas; *Tinea cruris*, referring to fungus infection of the upper, inner thighs; Onychomycosis, or fungus infections of the nails; and Dermatomycosis (dermatomycosis), a term usually restricted to superficial infections of the feet, hands and nails.

Athlete's foot, which is one of the major types of the superficial mycotic infections, is classified among dermatophytosis. It is variously estimated that from 50% to 90% of the population of the United States have dermatophytosis of some type during their lives. Among the common organisms which give rise to this disease are *Trichophyton mentagrophytes, Trichophyton rubrum* and *Epidermophyton floccosum*. *Trichophyton mentagrophytes* is believed to be the cause of the acute form of athlete's foot and is the cause of most of the inflammatory reaction between the toes. Athlete's foot due to *Trichophyton rubrum* is a many-faceted disease entity characterized by a low grade inflammatory reaction and includes what is commonly known as chronic dermatophytosis and onychomycosis. *Epidermophyton floccosum* is occasionally involved in the cause of athlete's foot and gives rise to a subacute infection, however, this organism is more commonly involved in *Tinea cruris* or the infection involving the inner surface of the upper parts of the thighs.

When the active agents are employed in preventing topical fungal growth, one or more of the compounds may be uniformly distributed in a vehicle that is chemically compatable with the particular compound selected, noninhibiting with respect to the action of the antifungal and essentially noninjurious to body tissue under the conditions of use.

It should be understood that the 2-substituted benzimidazoles of the invention may be used in combination one with the other as well as with other fungicidally active materials. For instance, a mixture of 2-(4'-thiazolyl) benzimidazole and sorbic acid or its salts, propionic acid or its salts, mycostatin, sodium diacetate, trichomycin, amphotercin, griseofluvin, undecylenic acid, chlorquinadol, 5,7-dichloro-8-hydroxyquinoline (Vioform), sodium o-phenylphenate, o-phenylphenol, biphenyl, chlorinated phenols, sodium benzoate, dehydroacetic acid and its salts or esters of parahydroxybenzoic acid, such as the methyl and propyl ester (parabens) can be used to give fungicidal effect when used in appropriate concentrations. It is quite clear, too, that the compounds defined according to Formula II above may be used in conjunction with effective antibacterial materials in appropriate instances so as to combine the action of each in such a situation as to be particularly useful, for instance, in applications where the presence of bacteria creates undesirable results alongside the detrimental action of fungi. Accordingly, a combination of antifungal and antibacterial agents will be useful in the preparation of germicidal soaps, in the production of cosmetics, and in food, such as beer, cheese, or meat, and leather applications.

It has been found that growth of various fungi existing in soil is limited or terminated by the addition to the soil of minor quantities of the benzimidazole compounds described. The term soil as used herein is intended to include all media capable of supporting the growth of plants and may include humus, sand, manure, compost, artificially created plant growth solution, and the like.

We have also found that the fungicides of the invention are effective against fungal diseases of plants, and may be effectively used either by direct contact with the foliage or systemically, by introduction through the roots.

The compounds of this invention also have activity against bacteria and yeasts and may, at appropriate levels of concentration, be effectively used to inhibit or prevent the growth of these organisms. It will be quite clear to those skilled in the art that the benzimidazoles of this invention will vary in activity against a particular organism at a particular concentration. Consequently, while all the compounds of this invention are effective fungicides and bactericides, certain of the compounds will be more active than others against for instance yeast, mold or bacteria.

The fungicides described by Formula II above are useful in the field of food preservation where fungi are known to attack doughs, cakes, breads, pastries, meats, cheeses, fruits, vegetables, cereal, jams and jellies, brines, fish, poultry, fats and oils, juices, honey, syrup, condiments, alcoholic beverages, confections and other food products.

The present antifungals have been found effective in controlling fungus growth on cheese. They may be applied to the wrapper thereof or may be admixed directly with the edible itself. Application of the active agents to the wrapper may be made by any method known in the art such as by immersing, spraying or otherwise depositing the fungicide. All types of cheeses, notably cream cheese, American cheese, swiss cheese, blue cheese, muenster cheese, gruyere cheese, cottage cheese, cheddar cheese, farmer's cheese, parmesan cheese, ricotta cheese, mozzarella cheese and the like, may be effectively protected in this manner.

The fungicides of the present invention are useful in inhibiting mold growth in fruit such as citrus fruit. The active agent may be applied at any time before consumption and preferably after harvesting. For instance, the antifungal may be applied during initial storage, before or after shipping or during final storage before consumption. The benzimidazoles may be utilized in a number of ways in this regard and may be applied either directly to the fruit in an emulsion, solution, suspension or the like or it may be applied to the fruit container or wrapper. Suitable carriers for the active agents are waxes and other materials presently known in the art.

It has also been found according to the present invention that benzimidazoles described by Formula II above may be added to bread dough prior to mixing and baking and thereby protect the final product from mold spoilage. The active agent may be added to the brew or to any of the dry ingredients such as the flour as a concentrated solution, suspension or the like. A uniformly mixed dough is desirable in all cases. The active agent may also be added to the dough by dissolving it in shortening. For instance, when 0.02 gram of 2-(2'-thiazolyl) benzimidazole is dissolved in 30 grams of shortening, the resulting solution may be added to 1000 grams of flour to give a concentration of benzimidazole of 20 p.p.m. based on flour. In order that the concentration of the compounds of this invention be sufficient, so as to properly prevent mold growth on bread, quantities of from about 5–1000 p.p.m., preferably from about 30–200 p.p.m. based on flour may be utilized. The 2-substituted benzimidazoles of this invention such as 2-thiazolyl benzimidazoles are particularly efficacious in preserving bread in a manner superior to that now technically feasible with propionates without adversely affecting flavor, loaf volume or odor. In addition, there is frequently an increase in loaf volume when the compounds of this invention are employed as antifungal agents.

The use life of bread depends largely on its ability to resist mold spoilage. Suitable agents for preventing mold spoilage should at the same time have no specific inhibitory effect on any of the yeasts used for leavening. In principle, the most desirable agents for protecting bread from mold spoilage are those having selective action against mold outgrowth. Surprisingly, the benzimidazoles of Formula II above possess this highly desirable characteristic.

The compounds described by Formula II above may be prepared by treating an appropriately substituted nitroaniline with a heterocyclic carboxylic acid or a derivative thereof such as the ester or acid halide in a suitable inert solvent such as pyridine. The nitro group on the resulting anilide is then reduced and benzimidazole formation effected by treatment of said anilide with a reducing-cyclizing system such as zinc-hydrochloric acid, zinc-acetic acid, iron-hydrochloric acid and the like. Alternatively, the nitroanilide may be reduced by catalytic reduction and the product cyclized by use of a strong mineral acid such as hydrochloric acid.

Alternatively, the benzimidazoles of the invention may be prepared by reacting an appropriately substituted o-phenylenediamine and a heterocyclic carboxylic acid or derivative thereof, in polyphosphoric acid, preferably at temperatures of from about 175–275° C. for about 2–6 hours. The compounds described by Formula II above may also be synthesized by treating an o-phenylenediamine with a heterocyclic aldehyde in a reaction medium comprising nitrobenzene or in a suitable solvent such as a lower-alkanol. When the reaction is performed in solvent other than nitrobenzene, the intermediate product is treated with a suitable oxidizing agent such as cupric acetate, lead tetra-acetate, mercuric acetate, ferric chloride and the like. When a heavy metal reagent is used to bring about benzimidazole formation from an o-phenylenediamine in the above process, an insoluble heavy metal salt of the 2-heterocyclic benzimidazole is formed. This material is readily converted to the free benzimidazole by removal of the heavy metal salt by reagents suitable for this purpose, such as hydrogen sulfide, ammonium polysulfide, ammonium hydroxide and the like.

According to another process for making the above benzimidazoles, an appropriately substituted aniline may be treated with a heterocyclic nitrile in the presence of a suitable catalyst such as aluminum chloride to form an N'-phenylamidine derivative of the heterocyclic compound.

The above-mentioned N'-phenylamidine may then be chlorinated or brominated to produce an N-chloro or N-bromo-N'-phenylamidine. This halogenation is brought about by reacting said N'-phenylamidine with a positive halogenating agent capable of halogenating the nitrogen atom of the amidine group. The preferred halogenating agents are hypochlorous and hypobromous acid. These are conveniently formed in situ by addition of an alkali or alkaline earth metal hypohalite to a solution of the N'-phenylamidine acid addition salt, whereby neutralization of the acid addition salt and the generation of the halogenating agent occur concurrently. Typical hypohalites useful for this purpose are sodium or potassium hypochlorite, sodium hypobromite and calcium hypobromite.

The N-halo-N'-phenyl amidine resulting from the above halogenation is converted to the benzimidazole by treatment with a base, such as an alkali or alkaline earth metal hydroxide such as sodium hydroxide, potassium hydroxide or calcium hydroxide.

One method of obtaining a 1-substituted benzimidazole of Formula II above is by converting the non-1-substituted compound to an alkali metal salt, preferably the sodium salt, by intimately contacting said compound with sodium hydride in a suitable solvent. A slight molar excess of sodium hydride gives satisfactory results and equimolar quantities of benzimidazole and sodium hydride may also be used if desired. The reaction is conveniently brought about by warming the reactants at slightly elevated temperatures, but room temperature gives satisfactory results.

A 1-substituted benzimidazole may then be obtained by contacting the benzimidazole alkali metal salt with an acyl, loweralkyl, alkenyl, aralkyl or aralkenyl halide in an inert solvent. The reaction is allowed to proceed at a temperature of from about room temperature up to about 100° C.

The 2-substituted benzimidazoles described herein are normally isolated as the free base. The 1-unsubstituted benzimidazoles are readily converted to acid addition salts by treatment with acid. Examples of salts which may be formed in this manner are mineral acid salts such as the hydrohalides, e.g. hydrochloride, hydrobromide and hydroiodide, the sulfates, nitrates, phosphates and the like, aliphatic acid salts, and salts of polycarboxylic acids and the like. Certain of these salts, such as the hydrohalides, are much more water soluble than the free bases. Since the solubility may also be decreased by formation of an appropriate salt, it will be seen that the solubility properties of a particular compound may be conveniently adjusted by judicious selection of a salt.

The examples following are given for the purpose of illustration and not by way of limitation.

EXAMPLE 1

Bread is prepared by a brew process as follows:

TRIPLE BREW FORMULATION

| | Grams |
|---|---|
| Water | [1] 1800 |
| Flour | 300 |
| Sucrose | 23 |
| Arkady's yeast food | 15 |
| Dry milk solids, nonfat | 45 |
| Yeast | 98 |
| Salt | 60 |

[1] 200 ml. of water are mixed separately to suspend the yeast. 100 ml. of water are used to dissolve the salt separately.

Water is mixed with all the dry ingredients with the exception of the salt and the yeast. A suspension of yeast is added and the brew is then fermented at 80–84° F. with contsant agitation. Salt solution (38%) is added after 15 to 20 minutes and the agitation reduced. Fermentation is allowed to proceed for 90–120 minutes. The brew is divided into three equal portions.

The dough is then prepared as follows:

900 grams of flour and 30 grams of sugar are intermixed. 3.1 grams of sodium propionate is dissolved in 20 ml. of water and 2.5 ml. of dough conditioner solution [one tablet of IDX (Food Industries Company) per liter of water] and added to one portion of the brew. In a similar manner, to a second portion is added 0.3 gram of 2-(4′-thiazolyl) benzimidazole. To the flour-sugar mix is added one of the three brews and 20 ml. of water used to rinse the brew container. Each of the remaining brews are similarly added to an identical flour mix. The three doughs are mixed at low speed for 15 seconds. 40 grams of shortening, melted by heating to 110° F. is added to each dough and mixing continued for 45 seconds. The mixing is continued for 3.5 minutes at a somewhat higher speed. Each portion of the dough is then fermented for 30–40 minutes at 80° F. and 75% relative humidity, cut into three portions each of which is molded, put in pans, proofed 35 minutes at 100° F. and 80–85% relative humidity, braked at 435–445° F. and cooked 30–40 minutes. The three loaves obtained from each treatment are further treated as follows:

(1) One loaf serves as a control.
(2) One loaf is sprayed with a water suspension of spores of *Aspergillus niger*.
(3) One loaf is sprayed with water suspension of spores of Penicillium species.

The loaves are wrapped in an appropriate moisture-proof, dust-proof barrier, placed in a 30° C. atmosphere and periodically examined for mold growth. The amount of growth occurring is evaluated as follows:

−=no growth exident;
+=slight mold growth;
++++++=extremely heavy mold growth.

The results are set forth in the table below.

TABLE I

| Time (Days) | Control | | | Sodium Propionate | | | 2-(4′-thiazolyl) benzimidazole | | |
|---|---|---|---|---|---|---|---|---|---|
| | Plain | Penicillium | A. niger | Plain | Penicillium | A. niger | Plain | Penicillium | A. niger |
| 4 | − | − | + | − | − | − | − | − | − |
| 5 | − | ++ | ++ | − | − | − | − | − | − |
| 6 | − | ++++ | ++++ | − | − | − | − | − | − |
| 7 | − | +++++ | +++++ | − | + | + | − | − | − |
| 11 | [1] D | D | D | D | ++++ | +++++++ | D | − | [2] |

[1] Discarded.
[2] Only a few spots on air bubbles in the crust, no tendency toward spreading.

Similar tests are run using *Penicillium chysogenum*, *P. notatum*, *P. citrinum*, *P. digitatum*, *P. roqueforti*, *P. expansum*, *P. italicum*, *P. martensii*, *Aspergillus versicolor*, and *A. sydowi* and in each instance the benzimidazole is at least sixty times as effective in inhibiting growth as sodium propionate on a weight to weight basis.

EXAMPLE 2

In another experiment using the procedure of Example 1 0.0075 weight percent 2-(4′-thiazolyl) benzimidazole (based on flour) and 0.25 weight percent sodium propionate (based on flour) are used. The results are shown in Table II.

TABLE II

| Time (Days) | Control | | | 2-(4′-thiazolyl) benzimidazole | | | Sodium Propionate | | |
|---|---|---|---|---|---|---|---|---|---|
| | Plain | Penicillium | A. niger | Plain | Penicillium | A. niger | Plain | Penicillium | A. niger |
| 2 | − | − | − | − | − | − | − | − | − |
| 3 | − | + | +++ | − | − | − | − | − | +++ |
| 4 | − | +++ | +++++ | − | − | − | − | − | ++++ |
| 5 | + | ++++ | ++++++ | − | − | + | − | − | +++++ |
| 6 | + | ++++++ | +++++++ | − | − | + | − | − | +++++ |
| 7 | ++ | ++++++ | +++++++ | − | − | [1] ++ | + | − | +++++++ |

[1] No growth on crumb, little tendency to spread.

When 2-(2′-thiazolyl) benzimidazole is used in place of 2-(4′-thiazolyl) benzimidazole, substantially identical results as are shown in Table II are obtained.

EXAMPLE 3

To a clean, sterile flask is added 5 milligrams of 2-(4′-thiazolyl) benzimidazole and 0.3 milligram dimethylformamide as solvent. Sabouraud's dextrose agar (50 mg. Difco, pH 5.6) at about 50° C. is then poured into the flask and the contents thereof agitated to obtain uniform distribution of the benzimidazole therein. The mixture is then poured into Petri dishes and solidifies on cooling. A water suspension of the spores of *Trichophyton mentagrophytes*, the fungus which causes "athlete's foot," is streaked onto the medium in the Petri dish. After three days of storage at room temperature, complete inhibition of the fungus is noted.

EXAMPLE 4

In a manner similar to that in Example 3 a solution of 2-(4'thiazolyl) benzimidazole in dimethylformamide is prepared. A portion is then diluted with water so as to give varying concentration of benzimidazole such that when added to 50 mg. of agar, concentration of 7.8 to 250 mcg./ml. are obtained. After the agar is poured into Petri dishes and solidifies, it is inoculated with spores of a fungus of the type shown in Table III below. The concentration at which fungicidal action takes place is noted.

TABLE III.—ANTIFUNGAL ACTION OF 2-(4'-THIAZOLYL) BENZIMIDAZOLE

| Culture: | [1] Fungicidal concentration |
|---|---|
| Cryptococcus neoformans | 7.8–15.6 |
| Hormodendrum pedrosoi | 31.2–62.5 |
| Microsporum audouini | <7.8 |
| Microsporum gypseum | <7.8 |
| Trichophyton mentagrophytes | <7.8 |
| Trichophyton gypseum | 125–250 |
| Trichophyton rubrum | 15.6–31.2 |

[1] Concentration in mcg./ml.; incubation at 37° C. for 8 days.

EXAMPLE 5

(A) A water insoluble ointment for topical treatment of mycotic infection is prepared according to the following formulation:

| | Grams |
|---|---|
| Cholesterol | 30 |
| Stearyl alcohol | 30 |
| White wax | 80 |
| White petrolatum | 860 |
| 2-(2'-methyl-4'-thiazolyl) benzimidazole | 90 |

(B) A water soluble ointment for treatment of topically disposed mycotic infection is composed of:

| | Grams |
|---|---|
| Polyethylene glycol (M.W. 4000) | 4000 |
| Polyethylene glycol (M.W. 400) | 800 |
| 2-[3'-(1',2',5'-thiadiazolyl)] benzimidazole | 100 |

The above ointments and the cream of Example 6 are formulated using techniques known to those skilled in the art.

EXAMPLE 6

A cream preparation for topical application of active agent is prepared according to the following formulation:

| | |
|---|---|
| Cetyl alcohol, grams | 9.2 |
| Stearyl alcohol, grams | 9.2 |
| Sodium lauryl sulfate, grams | 1.5 |
| White petrolatum, ml. | 30.0 |
| Propylene glycol, ml. | 10.0 |
| Distilled water to make total of, grams | 100.0 |
| 2-(4'-thiazolyl) benzimidazole, grams | 11.1 |

The compounds of this invention are useful in topical preparations in concentrations of from about 0.01% to about 30%, preferably from about 0.5% to about 15%.

EXAMPLE 7

Swatches of cotton are impregnated with alcohol solutions of 2-(4'-thiazolyl) benzimidazole at varying concentrations. The fabrics are air dried and inoculated with a mixture of organisms comprising *Aspergillus niger, Aspergillus terreus, Aspergillus flavus, Aspergillus oryzae, Penicillium chrysogenum* and *Chaetomium globosum*, which are suspended in Brain-Heart-Infusion (BHI-Difco) broth acidified to pH 5.5 with 1% tartaric acid. The fabric is then dried at room temperature, individually placed into sterile Petri dishes and is incubated at room temperature in a 100% humidity atmosphere. After 10 days the following results are noted.

| Concentration of 2-(4'-thiazolyl) benzimidazole (p.p.m.): | Growth of mold |
|---|---|
| 0 | Positive. |
| 6.3 | Positive (1 spot). |
| 12.5 | Negative. |
| 25 | Do. |
| 50 | Do. |
| 100 | Do. |

EXAMPLE 8

Into one of eleven sterile flasks is placed 25 mg. of one of the eleven compounds noted below. Into each of the other ten flasks are similarly placed the ten remaining compounds. A small amount of dimethylformamide is added as solvent. The solutions are then diluted with water, so as to give concentration of active ingredient such that when added to 50 ml. of potato dextrose agar (pH 5.6, Difco), concentrations of 3.1 to 250 mcg./ml. are obtained. The agar is then poured into Petri dishes and allowed to solidify. Inoculation with spores of *Aspergillus niger* and *Penicillium* species is then effected and the concentration at which fungicidal action takes place is noted after three days incubation at room temperature.

CONCENTRATIONS EFFECTIVE IN CONTROLLING FUNGUS GROWTH

| Antifungal Agent | Effective Concentration [1] Against— | |
|---|---|---|
| | A. niger | P. species |
| 2-(4'-thiazolyl) benzimidazole | <3.1 | <3.1 |
| 2-[3'-(1',2',5'-thiadiazolyl)] benzimidazole | 25–50 | 3.1–6.3 |
| 2-(2'-thiazolyl) benzimidazole | 50–100 | 6.3–12.5 |
| 2-(4'-thiazolyl)-5-methoxy benzimidazole | 50–100 | 25–50 |
| 1-acetyl-2-(4'-thiazolyl) benzimidazole | <3.1 | <3.1 |
| 2-(4'-thiazolyl)-5, 6-difluoro benzimidazole | 6.3–12.5 | <3.1 |
| 2-(4'-thiazolyl)-5-fluoro benzamidazole | 3.1–6.3 | <3.1 |
| 2-(4'-thiazolyl)-5-(4'-fluorophenyl) benzimidazole hydrochloride | 12.5–25 | 12.5–25 |
| 2-(4'-thiazolyl)-5-bromo benzimidazole | 12.5–25 | 3.1–6.3 |
| 2-(4'-thiazolyl)-5-phenyl benzimidazole | 25–50 | 50–100 |
| 2-(4'-thiazolyl)-5-(2'-fluorophenyl) benzimidazole hydrochloride | 50–100 | 50–100 |

[1] Growth noted at low concentration but not at the high concentration.

EXAMPLE 9

2-(4'-thiazolyl) benzimidazole is pipetted into soil infested with *Rhizoctonia solani* so as to give a concentration of 110 p.p.m. in the soil. The fungus infested soil and a control devoid of 2-(4'-thiazolyl) benzimidazole are separately placed into paper containers, cotton is planted therein, and the plant inspected three weeks thereafter for symptoms of disease. 50 percent control of *Rhizoctonia solani* is exhibited.

EXAMPLE 10

The process of Example 9 using 2-(4'-thiazolyl) benzimidazole and soil infested with *Fusarium solani* is repeated using bean plants. 100 percent control at 27 p.p.m. is noted.

EXAMPLE 11

The process of Example 9 using soil infested with *Pythium ultimum* gives results which show that 2-(4'-thiazolyl) benzimidazole partially controls fungal activity at 50 p.p.m.

EXAMPLE 12

Pinto bean plants are thoroughly sprayed with various concentrations of 2-(4'-thiazolyl) benzimidazole in water. After drying, the plants are inoculated with rust and powdery mildew spores. The results, noted when disease symptoms are distinct on untreated beans, are as follows:

| Fungus | Concentration of 2-(4'-thiazolyl) benzimidazole, p.p.m. | Percent Growth Inhibition |
|---|---|---|
| Rust | 1,000 | 90 |
| Do | 500 | 85 |
| Do | 100 | 80 |
| Mildew | 1,000 | 100 |
| Do | 500 | 100 |
| Do | 100 | 90 |

EXAMPLE 13

The procedure used in Example 12 is repeated on early blight-infected tomatoes and celery. The results are as follows:

| Crop | Fungus | Concentration of 2-(4'-thiazolyl) benz-imidazole, p.p.m. | Percent Growth Inhibition |
|---|---|---|---|
| Tomato | Alternaria solani | 1,000 | 100 |
| Do | Alternaria solani | 500 | 90 |
| Do | Alternaria solani | 100 | 85 |
| Celery | Early Blight | 1,000 | 100 |
| Do | do | 500 | 100 |
| Do | do | 100 | 90 |

EXAMPLE 14

2-(4'-thiazolyl) benzimidazole is diluted to various concentrations in distilled water and poured into test tubes. A pinto bean plant is placed in each tube with a cotton plug that provides stem support and prevents evaporation. 4–8 hours later the plants are inoculated with rust and powdery mildew spores. Rust is completely controlled at a rate of 25 p.p.m. based on carrier, and powdery mildew is completely controlled at 1 p.p.m.

EXAMPLE 15

The compounds listed below are dissolved in dimethylformamide and potato dextrose agar is added thereto to give a concentration of drug of 100 mcg./ml. The medium is inoculated with molds of Aspergillus niger and Penicillium species by streaking the agar with a wire loop. The compounds inhibiting the molds at 100 mcg./ml. are tabulated below. The numeral 4 represents high drug activity, whereas 3, 2 and 1 indicate correspondingly lesser degrees of drug activity.

| Compound | A. niger | P. species |
|---|---|---|
| 2-(4'-thiazolyl)-5-(4'-fluorophenyl) benzimidazole hydrochloride | 4 | 4 |
| 2-(4'-thiazolyl)-5-fluoro benzimidazole | 4 | 4 |
| 2-(4'-thiazolyl)-5-bromo benzimidazole | 4 | 4 |
| 2-(4'-thiazolyl)-5-phenyl benzimidazole | 4 | 4 |
| 2-(4'-thiazolyl)-5-(2'-fluorophenyl) benzimidazole hydrochloride | 4 | 4 |
| 2-(2'-thiazolyl) benzimidazole | 4 | 4 |
| 1-benzoyl-2-(4'-thiazolyl) benzimidazole | 4 | 4 |
| 2-(4'-thiazolyl)-5,6-difluoro benzimidazole | 4 | 4 |
| 1-acetyl-2-(4'-thiazolyl) benzimidazole | 4 | 4 |
| 2-(4'-thiazolyl)-5-(4'-methoxyphenyl) benzimidazole hydrochloride | 1 | 1 |
| 2-(4'-thiazolyl)-5-phenoxy-6-phenyl benzimidazole hydrochloride | 2 | 1 |
| 2-[3'-(1',2',5'-thiadiazolyl)] benzimidazole | 4 | 4 |
| 2-(4'-thiazolyl)-5-methoxy benzimidazole | 4 | 4 |
| 2-(2'-methyl-4'-thiazolyl) benzimidazole | 3 | 2 |
| 2-[4'-(1',2',3'-thiadiazolyl)] benzimidazole | | 2 |

EXAMPLE 16

Processed American cheese containing no preservative is sliced, trimmed and inoculated with a species of Penicillium obtained from moldy cheddar cheese. Small uniform stacks of sliced cheese weighing approximately 3⅜ oz. each are inoculated with a fine mist of mold spores. The samples are wrapped as tightly as possible with a cellophane laminate wrapper and heat sealed with a minimum of entrapped air. The wrapping material is coated before wrapping with 2-(4'-thiazolyl) benzimidazole, sorbic acid or is left uncoated. The sorbic acid level varies from 1.07 mg./sq. in. to 2.99 mg./sq. in. with a median of 1.32 mg./sq. in. The amount of 2-(4'-thiazolyl) benzimidazole used per sq. in. of wrapper varies from 0.030 mg. to 0.724 mg. (median of 0.252 mg.). The wrapped samples are packed tightly together in standard 5 lb. cheese cartons and refrigerated at 45° F. to 50° F. Observations for mold growth are made at weekly intervals.

All six of the samples in untreated wrappers show visible mold growth after 5 weeks' storage. One of the six sorbic acid treated samples (1.07 mg./sq. in.) show mold growth at a point or poor contact between cheese and wrapper. None of the eighteen samples treated with 2-(4'-thiazolyl) benzimidazole contain visible mold growth at this 5 week check. After 8 weeks of storage, one of the 2-(4'-thiazolyl) benzimidazole treated samples (0.141 mg./sq. in.) showed mold growth at a point of poor contact with the wrapper. After 20 weeks a second sorbic acid treated sample (1.49 mg./sq. in.) has visible Penicillium mold growth.

After 22 weeks of storage, a total of two of the six sorbic acid treated samples and one of the 18 2-(4'-thiazolyl) benzimidazole treated samples are spoiled by the Penicillium mold.

EXAMPLE 17

Samples of cream cheese are treated with 40 p.p.m. of 2-(4'-thiazolyl) benzimidazole, 500 p.p.m. of potassium sorbate and 1500 p.p.m. of calcium propionate. The cheese samples are spread in sterile Petri plates and inoculated by loop from suspensions of the molds Aspergillus niger, Penicillium roqueforti and Penicillium notatum. All samples are stored at 28° C. for 4 days. The untreated samples show abundant growth of all three molds after the 4 days, whereas the samples treated with 40 p.p.m. 2-(4'-thiazolyl) benzimidazole show no mold growth. The 1500 p.p.m. calcium propionate allows a trace of A. niger growth while 500 p.p.m. of potassium sorbate shows little inhibitory effect on A. niger.

EXAMPLE 18

2-(4'-thiazolyl) benzimidazole hydrochloride is added to sterile water to obtain a water solution thereof. The solution is added to Sabouraud's dextrose agar to achieve a benzimidazole concentration ranging from 0.1 to 100 mcg. per ml. About 20 mcg. of penicillin and 40 mcg. of streptomycin are added to the agar to control possible bacterial contamination.

The inocula is prepared by growing the various cultures in Sabouraud's dextrose liquid medium at 24° C. The cultures are hand ground to afford a fine suspension.

The fungal suspension is streaked on the surface of the agar with a standard wire loop. The plates are incubated at 24° C. The lowest level of drug which prevented growth is recorded as the minimal inhibitory con-

FUNGISTATIC ACTIVITY OF 2-(4'-THIAZOLYL) BENZIMIDAZOLE AGAINST SAPROPHYTIC FUNGI

| Culture: | Minimal inhibitory concentration (mcg./ml.) |
|---|---|
| Alternaria solani | 4 |
| Aspergillus flavus | 4 |
| Aspergillus fumigatus | 8 |
| Aspergillus luchensis | 20 |
| Aspergillus nidulans | 8 |
| Aspergillus niger | 40 |
| Aspergillus glaucus | 1 |
| Aspergillus terreus | 4 |
| Chaetomicum clivaceum | 20 |
| Monilia nigra | 10 |
| Penicillium oxalicum | 1 |
| Penicillium spinulosum | 1 |
| Penicillium funiculosum | <1 |

EXAMPLE 19

A water solution of 2-(4'-thiazolyl) benzimidazole and inocula of the fungi listed below are prepared in a manner similar to that described in Example 18. The benzimidazole's fungicidal effect is evaluated by tube dilution procedure using Sabouraud's dextrose medium containing 10% heat-inactivated horse serum. The tubes are inoculated and incubated at 37° C. Fungal growth is recorded at intervals over a 20 day period. The minimal inhibitory concentration is the lowest drug level which prevented growth. The following table shows the results obtained:

FUNGICIDAL ACTIVITY OF 2-(4'-THIAZOLYL) BENZIMIDAZOLE AGAINST PATHOGENIC FUNGI

| Culture: | Minimal inhibitory concentration (mcg./ml.) |
|---|---|
| Cryptococcus neoformans | 20–30 |
| Geotrichum sp. | 15 |
| Hormodendrum pedrosoi | 10–15 |
| Microsporum audouini | 7.8 |
| Microsporum gypseum | 0.5–1.0 |
| Trichophyton mentagrophytes | 1–2 |
| Trichophyton gypseum | 6–8 |
| Trichophyton rubrum | 1 |

EXAMPLE 20

There is dissolved in 5 ml. of dimethylformamide a quantity of 2-(4'-thiazolyl) benzimidazole such that addition of Sabouraud's liquid medium and further dilutions with the liquid substrate give 2.5 to 100 p.p.m. of drug in the medium. The medium is sterilized (121° C., 15 minutes, 15 p.s.i.g.) and then inoculated with test organism suspended in sterile water. The following results indicate that quantity of compound in parts/million required to fully inhibit fungus growth.

ANTIFUNGAL ACTIVITY

| Fungus: | Minimal inhibitory concentration p.p.m. |
|---|---|
| Aspergillus species (obtained from moldy tobacco) | 2.5 |
| Penicillium species (obtained from moldy tobacco) | 2.5 |
| Lenzites trabea | 5 |
| Pullalaria pullulans | 5 |
| Aspergillus oryzae | 5 |
| Rhizopus species | 100 |
| Penicillium cyclopium | 2.5 |
| Monilia sitophila | 100 |
| Neurospora sitophila | 5 |
| Phoma terrestrius | 5 |

EXAMPLE 21

The procedure of Example 20 is used except that potato dextrose medium is utilized in place of Sabouraud's liquid medium. Ceratocystis pilifera is inhibited at 100 p.p.m., the lowest level tested.

EXAMPLE 22

The fungicidal effect of 2-(4'-thiazolyl) benzimidazole is evaluated by subculturing 0.05 to 0.1 ml. of the medicated agar from each of the tubes used in the test procedure of Example 19. Subcultures are made to Sabouraud dextrose agar slants. The presence or absence of growth is recorded after 8 to 21 days incubation at 37° C. and the following results are recorded.

FUNGICIDAL ACTIVITY OF 2-(4'-THIAZOLYL) BENZIMIDAZOLE AGAINST PATHOGENIC FUNGI

| Culture | Minimal inhibitory concentration (mcg./ml.) |
|---|---|
| Trichophyton gypseum | 8 |
| Trichophyton mentagrophytes | 2 |
| Trichophyton rubrum | 1 |
| Microsporum gypseum | 1 |

EXAMPLE 23

A water suspension of spores of Trichophyton mentagrophytes are intimately admixed with Sabouraud's dextrose agar and the medium is poured into Petri dishes and allowed to jell. A dose of 40 mg./kg. of 2-(4'-thiazolyl) benzimidazole is intravenously infused into 2 dogs and 30 minutes thereafter serum is taken from them. The fungal growth permitted by the serum is compared to the growth taking place after agar inoculation of a known concentration of drug solution. A drug concentration of up to 30 mcg./ml. in the serum is noted. Tenfold dilution of this serum prevents the growth of T. mentagrophytes on Sabouraud's dextrose medium.

Two dogs are treated with an oral dose of 200 mg./kg. of 2-(4'-thiazolyl) benzimidazole and serum is taken from them 90 minutes after dosage. This serum is effective in inhibiting the growth of T. mentagrophytes on Sabouraud's dextrose medium.

EXAMPLE 24

The antifungal activity of 2-(4'-thiazolyl)-5,6-difluoro benzimidazole and metal complexes of 2-(4'-thiazolyl) benzimidazole are tested for activity against Trichophyton mentagrophytes by the agar streak procedure used in Example 18. The drugs are suspended in sterile distilled water and added to Sabouraud dextrose agar to yield final concentrations of 0, 0.1, 0.5, 1, 2, 4, 6, 8, 10, 25, 50 and 100 mcg./ml. The surface of the agar is streaked with a suspension of the test microorganism and the plates incubated at room temperature for 14 days. The minimal inhibitory concentration is recorded as the lowest drug concentration which prevented visible growth. The results are noted in the following table:

| Compound | Minimal inhibitory concentration (mcg./ml.) (14 day incubation) |
|---|---|
| 2-(4'-thiazolyl) benzimidazole copper complex | 8.0 |
| 2-(4'-thiazolyl) benzimidazole lead complex | 4.0 |
| 2-(4'-thiazolyl) benzimidazole copper complex | 2.0 |
| 2-(4'-thiazolyl) benzimidazole zinc complex | 2.0 |
| 2-(4'-thiazolyl) benzimidazole iron complex | 2.0 |
| 2-(4'-thiazolyl) benzimidazole cobalt complex | 2.0 |
| 2-(4'-thiazolyl) benzimidazole mercury complex | 4.0 |
| 2-(4'-thiazolyl) benzimidazole manganese complex | 2.0 |
| 2-(4'-thiazolyl) benzimidazole nickel complex | 2.0 |
| 2-(4'-thiazolyl)-5,6-difluoro benzimidazole | 6.0 |
| 2-(4'-thiazolyl) benzimidazole hydrochloride | 1.0 |

The above complexes are prepared by intermixing a water solution of metal salt with 2-(4'-thiazolyl) benzimidazole in methanol.

EXAMPLE 25

The method of Example 24 is used to test the antifungal activity of 2-(4'-thiazolyl) benzimidazole hydrochloride against Clavaceps purpura. The compound inhibits the growth of this fungus at 50 mcg./ml.

EXAMPLE 26

The compounds listed below are screened for in vitro activity against the dermatophytes, Trichophyton mentagrophytes and Trichophyton rubrum. The activity of the compounds is evaluated by the procedure utilized in Example 4. The drugs are prepared in suspensions or solutions in 1% emulphor and added to Sabouraud dextrose agar containing 40 micrograms per ml. of streptomycin, 20 micrograms per ml. of penicillin and 10% inactivated horse serum. Drug concentrations of from 0.1 to 100 micrograms per ml. are employed. The plates are incubated at room temperature and growth is recorded after 10 days of incubation. The minimal inhibitory concentration is recorded as the lowest drug level which inhibited growth.

ANTIFUNGAL ACTIVITY

| | Minimal Inhibitoryl. Concentration mcg./m | |
|---|---|---|
| | T. rubrum | T. mentagrophytes |
| 1-benzoyl-2-(4'-thiazolyl) benzimidazole | 2 | 2 |
| 2-(2'-thiazolyl) benzimidazole | 8 | 8 |
| 2-(4'-thiazolyl)-5-fluoro benzimidazole | 4 | 4 |
| 2-(4'-thiazolyl)-5-(4'-fluorophenyl) benzimidazole hydrochloride | 100 | 50 |
| 2-(4'-thiazolyl) benzimidazole | 1 | 1 |

EXAMPLE 27

Six patties of dog food meat are separated into three groups of two patties each, the first two being prepared so as to contain 50 p.p.m. of 2-(4'-thiazolyl) benzimidazole, the second couple being prepared to contain 2000 p.p.m. of potassium sorbate, and the third couple remaining untreated. All six meat patties are then placed in an incubator earlier exposed to fungus infected dog food meat and maintained at 90° F. at 85% relative humidity. After two weeks of incubation both untreated samples spoiled from mold growth. Three and one-half weeks after initial placement in the incubator one of the two patties treated with potassium sorbate spoiled whereas the two meat patties containing 50 p.p.m. of 2-(4'-thiazolyl) benzimidazole remained unspoiled.

EXAMPLE 28

Five oranges are scratched and dipped into ethanol containing 1% of 2-(4'thiazolyl) benzimidazole. Five other oranges are similarly scratched and treated with ethanol without drug added. All ten oranges are sprayed with a fine mist of mold spore suspension containing *Penicillium digitatum* and *Penicillium italicum*. The inoculated oranges are stored at room temperature in plastic containers which allow free air flow. After 19 days all the oranges dipped in ethanol without the antifungal are spoiled by the Penicillium, whereas after the same period of time no orange dipped in ethanol containing the benzimidazole displays mold growth.

In a second test, 12 oranges are separated into three groups of four oranges each. The oranges are all scratched and one group of four oranges is dipped into wax (Johnson's Industrial Wax) containing 250 p.p.m. of 2-(4'-thiazolyl) benzimidazole in solution and suspension. A second group of oranges is dipped into wax without added antifungal and the third group remains untreated. All 12 oranges are sprayed with a fine mist of a suspension containing *Penicillium digitatum* and *Penicillium italicum* and are stored at room temperature in plastic containers which allow free air flow. The results of this test are summarized in the following table.

| Treatment | Number of oranges spoiled by Penicillium | | | |
|---|---|---|---|---|
| | 10 days | 13 days | 20 days | 23 days |
| Untreated | 1 | 2 | 3 | 4 |
| Wax alone | 2 | 3 | 4 | 4 |
| 2 (4' thiazolyl) benzimidazole | 0 | 0 | 0 | 0 |

EXAMPLE 29

The fungus *Trichophyton mentagrophytes* is incubated at room temperature for seven days and then refrigerated and used for stock culture. Five ml. of this culture is inoculated into 100 ml. of Mycophil Broth and grown on the shaker for 72 hours. The culture is homogenized and this homogenate is used to infect the animals.

The guinea pigs used in these studies are the Holtzman strain weighing 350–400 gms. Hair is removed from a large section of the back using animal clippers. An area about 2" x 2" is abraded with a scalpel blade with care being taken to not rupture the skin. About 0.1 ml. of the homogenized *Trichophyton mentagrophytes* culture is rubbed into the abraded area with a cotton tipped applicator. The guinea pigs are infected again the next day.

Beginning four days post-infection, hairs are plucked daily from the infected area and placed on Mycosel Agar (BBL) slants. The slants are incubated at room temperature for 14 days. The infection in the guinea pig is self limiting and clears up spontaneously in about 30–45 days.

TABLE 1.—ACTIVITY OF 2-(4'-THIAZOLYL) BENZIMIDAZOLE AGAINST TRICHOPHYTON MENTAGROPHYTES INFECTION OF GUINEA PIGS

| Drug | Concentration, percent | Number of Days with Positive Hair Culture [1] | Mean |
|---|---|---|---|
| Control | | 37 | 31 |
| Desenex [2] | | 0 | 8.3 |
| | | 0 | |
| | | 25 | |
| 2-(4'-thiazolyl) benzimidazole | 4 | 1 | 0.3 |
| | | 1 | |
| | | 0 | |

TABLE 2.—ACTIVITY OF 2-(4'-THIAZOLYL) BENZIMIDAZOLE AGAINST TRICHOPHYTON MENTAGROPHYTES INFECTION OF GUINEA PIGS

| Drug | Concentration, percent | Number of Days with Positive Hair Culture [1] | Mean |
|---|---|---|---|
| Control | | 20 | 17.2 |
| | | 18 | |
| | | 15 | |
| | | 17 | |
| | | 16 | |
| Desenex | | 8 | 7.2 |
| | | 6 | |
| | | 7 | |
| | | 8 | |
| | | 7 | |
| 2-(4'-thiazolyl) benzimidazole | 4 | 3 | 3.8 |
| | | 7 | |
| | | 8 | |
| | | 1 | |
| | | 0 | |

[1] Therapy is started 12 days post-infection and continues to the end of the experiment. First day of therapy is considered Day 0.

TABLE 3.—ACTIVITY OF 2-(4'-THIAZOLYL) BENZIMIDAZOLE AGAINST TRICHOPHYTON MENTAGROPHYTES INFECTION OF GUINEA PIGS

| Drug | Concentration, percent | Number of Days with Positive Hair Culture [1] | Mean |
|---|---|---|---|
| Control | | 20 | 18 |
| | | 14 | |
| | | 20 | |
| 'Estergel' [2] | | 17 | 13.2 |
| | | 13 | |
| | | 18 | |
| | | 9 | |
| | | 10 | |
| | | 11 | |
| Desenex | | 17 | 10 |
| | | 6 | |
| | | 6 | |
| | | 8 | |
| 2-(4'-thiazolyl) benzimidazole | 4 | 8 | 7.2 |
| | | 8 | |
| | | 6 | |
| | | 7 | |
| | | 8 | |
| Absorbine Jr. [3] | | 12 | 10.8 |
| | | 16 | |
| | | 9 | |
| | | 9 | |

[1] Therapy begins 16 days post-infection and continues to the end of the experiment. First day of therapy is considered Day 0.
[2] Trademark of Merck & Co., Inc. for a gelled isopropyl myristate.
[3] Trademark of W. J. Young, Inc.

EXAMPLE 30.—2-(4'-THIAZOLYL)-5(6)-PHENYL BENZIMIDAZOLE 18.6 gm. of thiazole-4-carboxylic acid is refluxed with 80 ml. of thionyl chloride until hydrogen chloride evolution ceases. The mixture is then evaporated to dryness in vacuo and the 4-thiazole carboxylic acid chloride added portionwise, as a solid, to a solution of 30.9 gm. of 3 - nitro - 4 - aminobiphenyl in 150 ml. of dry pyridine at room temperature. The mixture is then heated on the steam bath, with stirring, for about 1 hour. The dark homogeneous solution is poured onto ice. The resulting precipitate is filtered off and washed with water, 2.5 N hydrochloric acid, water, saturated sodium bicarbonate solution and finally with fresh water. The solid is recrystallized from acetone to give N - (2 - nitro - 4 - biphenyl)-4'-thiazole carboxamide; M.P. 215–217° C.

14.3 gm. of N - ( 2 - nitro - 4 - biphenyl)-4'-thiazole carboxamide in 250 ml. of ethanol is reduced with hydrogen at 50° C. using 3 gm. of 5% palladium on charcoal catalyst. The catalyst is then filtered off and washed well with excess boiling ethanol. The combined ethanol solutions are concentrated in vacuo to a volume of about 500 ml. To this solution is added 250 ml. of concentrated hydrochloric acid. A solid precipitates. The mixture is refluxed for 6 hours and then allowed to come to room temperature. The precipitated solid 2-(4'-thiazolyl)-5(6)-phenyl benzimidazole hydrochloride is filtered off and suspended in ethanol. An excess of concentrated ammonium hydroxide is added. A precipitate forms. Ethanol is added until a homogeneous solution forms. The solution is treated with decolorizing charcoal and filtered into a large volume of water. The dark gummy precipitate which forms is recrystallized from ethyl acetate to give 2-(4'-thiazolyl)-5(6)-phenyl benzimidazole; M.P. 216–217° C.

EXAMPLE 31.—1-BENZOYL-2-(4'-THIAZOLYL)-5-PHENYL BENZIMIDAZOLE

To 15 gm. (0.05 mole) of 2-(4'-thiazolyl)-5(6)phenyl benzimidazole is added sufficient 1:1 benzene dimethylformamide mixture to give substantial solution at gentle reflux. A few ml. of benzene is then distilled to dry the mixture. 0.055 M of sodium hydride is added to the reaction flask as a suspension in dry benzene. While the reaction mixture is stirred (30 minutes), hydrogen gas evolves and the sodium salt is formed. 7.7 gm. (0.55 M) of benzoyl chloride in 10 ml. of dry benzene is added dropwise to the sodium salt. After 30 minutes of stirring at gentle reflux, the reaction mixture is cooled, diluted with 2 volumes of dry toluene and the organic layer is washed with small portions of cold water. The organic solvent solution is then dried over magnesium sulfate, filtered and concentrated to permit recovery of the desired 1 - benzoyl - 2 - (4'-thiazolyl) - 5 - phenyl benzimidazole.

EXAMPLE 32.—4-(4'-METHOXYPHENYL)-o-NITROANILINE

A solution of 68 gm. of 4-phenylphenol in 250 ml. of pyridine at 10° C. is treated with 62 gm. of benzoyl chloride. The temperature of the reaction mixture is raised to 60° C. for ½ hour and then to boiling for ½ hour. The solution is allowed to cool and the product is crystallized. The mixture is added to 2 l. of water and an excess of concentrated hydrochloric acid is added. The resulting white solid is filtered, washed and dried giving 4-phenylphenyl benzoate; M.P. 150–152° C.

A solution of 53 gm. of 4-phenylphenyl benzoate in 410 ml. of glacial acetic acid at 90° C. is treated with 133 ml. of fuming nitric acid. The temperature is maintained at 90° C. during the addition. The mixture is allowed to cool to room temperature and the solid is filtered and washed with acetic acid. The solid is then digested with 750 ml. of boiling acetic acid. The mixture is cooled to 40° C., the supernatant liquor is decanted, and the solid is filtered, washed and dried giving 4'-nitro-4-phenylphenyl benzoate; M.P. 215–216.5° C.

A suspension of 6 gm. of 4'-nitro-4-phenylphenyl benzoate in 30 ml. of ethanol is heated to boiling and a solution of 4 gm. of potassium hydroxide in 10 ml. of water is slowly added. After 15 minutes the mixture is cooled and the potassium salt of 4-hydroxy-4'-nitrobiphenyl is obtained. This salt is suspended in 100 ml. of hot water and the mixture acidified with concentrated hydrochloric acid. The mixture is then cooled and the yellow solid, 4-hydroxy-4'-nitrobiphenyl, is filtered; M.P. 204–206° C.

A hot solution of 3.9 gm. of 4-hydroxy-4'-nitrobiphenyl and 2 gm. of potassium hydroxide in 50 ml. of water is treated wtih an excess of dimethyl sulfate in increments. The solution is kept alkaline by the addition of more potassium hydroxide. The yellow solid is filtered and immediately recrystallized from 50 ml. of ethanol, giving 4-methoxy-4'-nitrobiphenyl; M.P. 105–107° C. A second recrystallization from ethanol raises the melting point to 109–109.5° C.

A mixture of 2.8 gm. of 4-methoxy-4'-nitrobiphenyl, 15 ml. of acetic acid, 15 ml. of acetic anhydride, and 0.5 gm. of 5% palladium adsorbed on carbon as catalyst is reduced by hydrogen at 40 p.s.i. at room temperature. The catalyst is filtered and the filtrate concentrated to dryness at reduced pressure. The solid residue is recrystallized from 50 ml. of ethanol giving 4-(4'-methoxyphenyl) acetanilide; M.P. 207–208° C.

A solution of 1 gm. of 4-(4'-methoxyphenyl) acetanilide in 6 ml. of acetic anhydride is treated at 50° C. with a solution of 0.35 gm. of fuming nitric acid in 3 ml. of glacial acetic acid over a 15–20 minute period. The temperature is maintained at 50° C. for an additional 15 minutes and the solution is poured into 150 ml. of water. Filtration and recrystallization from ethanol gives 4-(4'-methoxyphenyl)-o-nitroacetanilide; M.P. 136–137° C.

A mixture of 0.53 gm. of 4-(4'-methoxyphenyl)-o-nitroacetanilide, 10 ml. of ethanol and 5 ml. of concentrated hydrochloric acid is refluxed for 10 minutes. Solution is obtained and the product then begins to separate. It is filtered, washed and dried giving 4-(4'-methoxyphenyl)-o-nitroaniline; M.P. 166–168° C.

EXAMPLE 33.—2-(4'-THIAZOLYL)-5(6)-(4'-METHOXYPHENYL) BENZIMIDAZOLE

A mixture of 2.56 gm. (0.02 mole) of thiazole-4-carboxylic acid, 100 ml. of toluene and 2.4 gm. (0.02 mole) of thionyl chloride is refluxed for 2 hours. To this mixture is added 4.9 gm. (0.02 mole) of p-(4'-methoxyphenyl)-o-nitroaniline, 100 ml. of toluene, and 40 ml. of pyridine. Refluxing is continued for 2 hours. The reaction mixture is poured into ice and water containing an excess of hydrochloric acid. The mixture is diluted with benzene to dissolve the precipitated solid. The layers are separated and the organic phase washed successively with dilute hydrochloric acid and with aqueous sodium bicarbonate solution. The solution is dried and concentrated to 200 ml., and the residue diluted with a large volume of Skelly Solve B. The precipitate is filtered and recrystallized from 350 ml. of methyl ethyl ketone. The yield of p-(4'-methoxyphenyl)-o-nitro-N-thiazole-carbonylanilide, M.P. 205–207° C., was 4.1 gm. (56%).

A mitxure of 0.57 gm. (0.0016 mole) of o-nitro-p-(4'-methoxyphenyl)-N-4'-thiazolecarbonylanilide, 50 ml. of methanol, 0.16 ml. (0.0016 mole) of concentrated hydrochloric acid, and 0.2 gm. of 5% palladium over darco catalyst is agitated in an atmosphere of hydrogen at 40 p.s.i. at room temperature. When the reduction is complete, the catalyst is filtered and the filtrate concentrated to dryness at reduced pressure. The residue is then used without further treatment.

A solution of about 0.5 gm. of p-(4'-methoxyphenyl)-N₁ - (4-thiazolecarbonyl)-o-phenylenediamine hydrochloride in 40 ml. of ethanol, 6 ml. of water, and 0.6 ml. of concentrated hydrochloric acid is refluxed for 4 hours and allowed to cool. The yield of 2-(4'-thiazolyl)-5(6)-(4'-methoxyphenyl) benzimidazole hydrochloride, M.P. (capillary tube) above 250° C., M.P. (micro-substage) 210–215° C., is 0.3 gm. (55%).

EXAMPLE 34.—2-(4'-THIAZOLYL)-5(6)-(2'-FLUOROPHENYL) BENZIMIDAZOLE HYDROCHLORIDE

A solution of 2.6 gm. of 2-fluoro-4-nitrobiphenyl in 50 ml. of methanol is reduced at 40 p.s.i. and room temperature with 0.5 gm. of 5% palladium on darco as a catalyst. The catalyst is filtered and the filtrate concentrated to dryness at reduced pressure leaving 2–3 gm. of 2-fluoro-4'-aminobiphenyl, an oil residue.

A mixture of 2.27 gm. (0.012 mole) of 2-fluoro-4'-aminobiphenyl, 1.32 gm. (0.012 mole) of 4-cyanothiazole in 1.62 gm. (0.0012 mole) of anhydrous aluminum chloride in 30 ml. of dry tetrachloroethane is stirred and poured into a cool solution of 10 gm. of sodium hydroxide and 150 ml. of water. The layers are separated and the aqueous phase extracted with methylene chloride. The combined organic phases are washed, dried and concentrated leaving an oily residue which is dissolved in a small quantity of methanol and diluted with water. This mixture is extracted with ether acetone, which extract is dried and concentrated giving 2.5 gm. of crude N-2-fluorobiphenyl (thiazole)-4-amidine; M.P. 120–124° C. After recrystallization from a mixture of ethanol and water, the material melts at 151–152° C.

A suspension of 1.7 gm. of the amidine in 50 ml. of methanol is brought into solution at pH 3.5–4 by the addition of concentrated hydrochloric acid. To the solution is added 2.0 ml. of 3 M sodium hypochlorite. After 3 minutes at room temperature, a solution of 0.35 gm. of sodium hydroxide in 2 ml. of water is added and the mixture refluxed for 10 minutes. The solution is cooled and adjusted to pH 2 by the addition of concentrated hydrochloric acid. The product then begins to crystallize and 0.85 gm. (45%) of 2-(4'-thiazolyl)-5(6)-(2'-fluorophenyl) benzimidazole hydrochloride, M.P. 245° C., transition point 145° C., is obtained.

EXAMPLE 35.—1-(4'-AMINOPHENYL) IMIDAZOLE

To a solution of 33.5 gm. of imidazole in 150 ml. of dimethylformamide is slowly added 26 gm. of sodium hydride. The mixture is stirred for about 30 minutes and it is then added to a solution of 78.8 gm. of p-chloronitrobenzene in 100 ml. of dimethylformamide. After an initial exothermic reaction takes place, the solution is refluxed for 1½ hours and poured into 1 l. of water. The precipitate is filtered, recrystallized from acetone, dissolved again in acetone and recrystallized to give N-(4'-nitrophenyl) imidazole; M.P. 195–198° C.

To 200 ml. of methanol is added 21.2 gm. of N-(4'-nitrophenyl) imidazole, 9.37 ml. of concentrated hydrochloric acid and 10 gm. of palladium absorbed on carbon catalyst. The mixture is hydrogenated for 1½ hours, filtered and the filtrate concentrated to ⅓ of its original volume. The solution is then diluted with 75 ml. of water and recrystallized with ammonium hydroxide. The precipitate formed is filtered and the filtrate evaporated under vacuum. The precipitate formed, N-(4'-aminophenyl) imidazole, melts at 141–143° C.

EXAMPLE 36.—2-(4'-THIAZOLYL)-5(6)-(4'-IMIDAZOLYL) BENZIMIDAZOLE

A suspension of 0.84 gm. (0.0027 mole) of N-[4'-(4-imidazolyl)]-2'-nitro-4'-thiazolecarboxanilide, prepared by reaction of thiazole-4-carboxylic acid chloride and 4-(4'-aminophenyl) imidazole and nitrating with nitric acid, in 150 ml. of methanol and 1.3 ml. of concentrated hydrochloric acid is reduced at room temperature and 40 p.s.i. with 0.5 gm. of 5% palladium over activated charcoal as catalyst. The solution is filtered from the catalyst and concentrated to dryness at reduced pressure. The residue is redissolved in a mixture of 25 ml. of water, 25 ml. of ethanol, and 2.5 ml. of concentrated hydrochloric acid, and the solution refluxed for 4 hours. It is concentrated to dryness at reduced pressure. The residue is dissolved in alcohol and an excess of ether is added giving 2-(4'-thiazolyl)-5(6)-(4'-imidazolyl) benzimidazole.

EXAMPLE 37.—2-(4'-THIAZOLYL)-5(6)-(2'-THIAZOLYL) BENZIMIDAZOLE

To a solution of 1.06 gm. (9.6 M mole) of 4-cyanothiazole and 1.69 gm. 2-(4'-aminophenyl) thiazole in 10 ml. of tetrachloroethane is rapidly added with stirring 1.28 gm. (9.6 M mole) of aluminum chloride. The mixture is stirred at reflux for 20 minutes, allowed to cool and treated with 20 ml. of 5 N sodium hydroxide. The black solid which forms is then separated by filtration and is completely dissolved by the addition of 50 ml. of methyl alcohol. The methyl alcohol solution is then added dropwise for 20 minutes to a stirred 5 N sodium hydroxide solution (75 mole). The mixture is then stirred for 5 minutes, filtered and dried, giving tan crystalline amidine having a melting point of 146–150° C. Recrystallization from water ethanol gives N-4-(2'-thiazolyl) phenyl (thiazole-4-amidine) melting at 150–153° C.

To a stired solution of 500 mg. (1.75 M mole) of the amidine formed above in 5 ml. of methyl alcohol and 5 ml. of water adjusted to pH 4.5 with concentrated hydrochloric acid is added ultimately 0.66 ml. of 2.89 N sodium hypochlorite. A solid precipitates. After stirring for 5 minutes, 0.084 gm. (2.11 mole) sodium hydroxide in 1 ml. of water is added. When heated to reflux almost complete solution of the solid results. Solution is then filtered and the filtrate allowed to cool at which time an oil deposits turning crystalline upon the addition of concentrated hydrochloric acid; M.P. 202–206° C. Recrystallization from water hydrochloric acid gives the desired product melting at 206–207° C.

EXAMPLE 38.—2-(4'-THIAZOLYL)-5(6)-DIMETHYLAMINO BENZIMIDAZOLE

A solution of 4.1 gm. (0.03 mole) of N,N-dimethyl-p-phenylenediamine in 50 ml. of toluene is added over a period of 30 minutes at room temperature to a solution of thiazole-4-carboxylic acid chloride, prepared by refluxing 3.9 gm. (0.03 mole) of thiazole-4-carboxylic acid and 3.3 ml. of thionyl chloride in 50 ml. of toluene. The solid that separates is filtered, washed with toluene, and dried; M.P. 181–183° C.

A small sample is converted to the free base by dissolving it in water, adding an excess of potassium bicarbonate, and extracting the base with ether.

To a cold solution of 1.4 gm. (0.005 mole) of N-(p-dimethylamino)-4'-thiazolecarboxanilide hydrochloride in 5 ml. of sulfuric acid over a period of 4–5 minutes is added 0.2 ml. (0.0044 mole) of fuming nitric acid in 2.5 ml. of sulfuric acid. After 10 minutes, the mixture is poured onto crushed ice. The ice is neutralized by the addition of potassium bicarbonate; and the maroon-colored solid which forms [N-(p-dimethylamino-o-nitro)-4'-thiazolecarboxanilide] is filtered, washed, and dried; M.P. 209–210° C. After recrystallization from alcohol, the material melts at 210.5–211° C.

A solution of 460 mg. (0.00157 mole) of N-(p-dimethylamino - o - nitro)-4'-thiazolecarboxanilide and 0.2 ml. (0.002 mole) of concentrated hydrochloric acid in 100 ml. of methanol is reduced at room temperature at 40 p.s.i. with 0.2 gm. of 5% palladium over activated charcoal. The charcoal is removed by filtration, and the filtrate concentrated to dryness at reduced pressure. The residue is dissolved in a mixture of 12 ml. of ethanol, 11 ml. of water and 1.2 ml. of concentrated hydrochloric acid, and the solution refluxed for 4 hours. The excess acid is neutralized by the addition of ammonia water, and solid begins to crystallize. The mixture is chilled, and the tan-colored solid [2-(4'-thiazolyl)-5(6)-dimethylamino benzimidazole] is filtered, washed, and dried; M.P. 231–234° C.

EXAMPLE 39.—2-(4'-THIAZOLYL)-5(6)-FLUORO BENZIMIDAZOLE

A mixture of 1.0 gm. (0.07 mole) of p-fluoro-aniline, 1.1 gm. (0.07 mole) of 4-cyanothiazole, 1.33 gm. (0.07 mole) of anhydrous aluminum chloride and 11 ml. of tetrachloroethane is stirred and refluxed for 20 minutes. The supernatant liquid is decanted; the residue dissolved in 25 ml. of methanol and then added to 50 ml. of a 5 N solution of sodium hydroxide. A large amount of water is added and the mixture extracted with ether. On removal of the ether, this extract yielded N-4'-fluorophenyl (thiazole-4-amidine), M.P. 100–102° C. Recrystallization from ethanol-water (1:1) produces a product which melts at 103.5–104.5° C.

A suspension of 4.4 gm. of N-4'-fluorophenyl (thiazole-4-amidine) in 25 ml. of methanol and 25 ml. of water is adjusted to pH 4.5 by the addition of concentrated hydrochloric acid. To the solution is added 7.3 ml. (1 equivalent) of 2.8 M sodium hypochlorite. After 3 minutes at room temperature a solution of 1 gm. of sodium hydroxide in 4 ml. of water is added. The mixture is refluxed for 10 minutes. A light-colored solid [2-(4'-thiazolyl)-5 (6)-fluoro benzimidazole] appears which after being cooled, is filtered, washed, and dried, and has a melting point of 251–253° C.

EXAMPLE 40.—2-(4'-THIAZOLYL)-5,6-DIFLUORO BENZIMIDAZOLE

A mixture of 5.2 gm. (0.04 mole) of 3,4-difluoroaniline, 4.4 gm. (0.04 mole) of 4-cyanothiazole and 5.4 gm. (0.04 mole) of anhydrous aluminum chloride in 50 ml. of tetrachloroethane is stirred and refluxed for 25 minutes and allowed to cool. The solvent is decanted and added to a stirred solution of 40 gm. of sodium hydroxide in 600 ml. of water. N-3,4-difluorophenyl (thiazole-4-amidine), M.P. 116–118° C., precipitates as the reaction product.

A mixture of 1.2 gm. of N-3,4-difluorophenyl-(thiazole-4-amidine) and 15 ml. of methanol is adjusted to pH 4.5 with concentrated hydrochloric acid. To this solution is added 3.2 ml. (1 equivalent) of 1.6 M sodium hypochlorite and the mixture is allowed to stand at room temperature for 3 minutes. A solution of 0.5 gm. of sodium carbonate in 12–15 ml. of water is added and the mixture is refluxed for 10 minutes. The mixture is cooled, more water added, and the product is filtered, washed and dried, giving 2-(4'-thiazolyl)-5,6-difluoro benzimidazole; M.P. 250° C.

Examples 30–40 inclusive are included for the purpose of describing processes for preparing the active antifungal agents described according to Formula II above and are merely illustrative. It should be understood that by the selection of appropriate starting materials all of the described antifungals may be prepared according to the methods of the above examples and process description. The active compounds per se and the processes for their preparation are not part of the present invention and some of these compounds and processes are claimed in pending United States patent applications filed by our colleagues.

It should be understood that although this invention has been described with reference to particular embodiments thereof, changes and modifications may be made which are within its intended scope and it should be limited only by the language of the appended claims.

We claim:

1. A method of controlling fungus growth which comprises contacting the area upon which fungus growth is to be controlled with an effective amount of antifungal ingredient containing a compound selected from the group consisting of a 2-R-benzimidazole wherein R is a member of the group consisting of thiazolyl, isothiazolyl and thiadiazolyl, and acid addition salts thereof.

2. A method of controlling fungus growth which comprises contacting the area upon which fungus growth is to be controlled with an effective amount of antifungal ingredient containing a compound selected from the group consisting of a 2-R-benzimidazole in which R is a heterocyclic radical containing nitrogen and sulfur as the hetero atoms, and acid addition salts thereof.

3. A method of controlling fungus growth which comprises contacting the area upon which fungus growth is to be controlled with an effective amount of antifungal ingredient containing 2-(4'-thiazolyl) benzimidazole.

4. A method of controlling fungus growth which comprises contacting the area upon which fungus growth is to be controlled with an effective amount of antifungal ingredient containing a compound selected from the group consisting of a compound having the formula

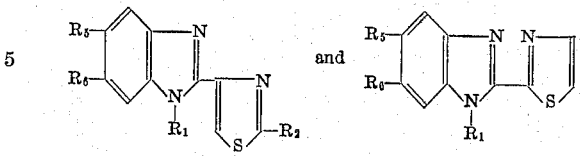

wherein $R_1$ is a member of the group consisting of hydrogen, acyl, loweralkyl, aralkyl, alkenyl and aralkenyl; $R_2$ is a member of the group consisting of hydrogen and loweralkyl; and $R_5$ and $R_6$ are members of the group consisting of hydrogen, loweralkyl, halo, phenyl, halophenyl, loweralkoxyphenyl, phenoxy and loweralkoxy, provided that when one of $R_5$ and $R_6$ is other than halo, at least one of $R_5$ and $R_6$ is hydrogen, and acid addition salts thereof.

5. A method of controlling fungi and bacteria comprising applying to a fungi and bacteria habitat an effective amount of 2-(4'-thiazolyl) benzimidazole.

6. A method of killing fungi which comprises contacting said fungi with an effective amount of antifungal ingredient containing a compound selected from the group consisting of a 2-R-benzimidazole wherein R is a member of the group consisting of thiazolyl, isothiazolyl and thiadiazolyl, and acid addition salts thereof.

7. A method of killing fungi which comprises contacting said fungi with an effective amount of antifungal ingredient containing a compound selected from the group consisting of a 2-R-benzimidazole in which R is a heterocyclic radical containing nitrogen and sulfur as the hetero atoms, and acid addition salts thereof.

8. A method of killing fungi which comprises contacting said fungi with an effective amount of antifungal ingredient containing a compound selected from the group consisting of a compound having the formula

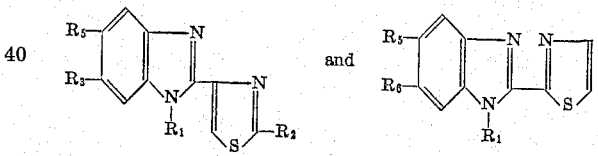

wherein $R_1$ is a member of the group consisting of hydrogen, acyl, loweralkyl, aralkyl, alkenyl and aralkenyl; $R_2$ is a member of the group consisting of hydrogen and loweralkyl; and $R_5$ and $R_6$ are members of the group consisting of hydrogen, loweralkyl, halo, phenyl, halophenyl, loweralkoxyphenyl, phenoxy and loweralkoxy, provided that when one of $R_5$ and $R_6$ is other than halo, at least one of $R_5$ and $R_6$ is hydrogen, and acid addition salts thereof.

9. A composition of matter useful in the preparation of bread having a high resistance to mold growth which comprises flour, yeast and a 2-R-benzimidazole where R is a heterocyclic radical containing nitrogen and sulfur as the hetero atoms.

10. A composition of matter useful in the preparation of bread having a high resistance to mold growth which comprises flour, yeast, and 2-(4'-thiazolyl) benzimidazole.

11. A method for preparing bread which is resistant to mold growth which comprises adding to the bread dough before baking a composition selected from the group consisting of a 2-R-benzimidazole wherein R is a member of the group consisting of thiazolyl, isothiazolyl and thiadiazolyl, and acid addition salts thereof.

12. A method for preparing bread which is resistant to mold growth which comprises adding to the bread dough before baking 2-(4'-thiazolyl) benzimidazole.

13. A method of controlling the growth of a fungus of the group consisting of Aspergillus species and Penicillium species which comprises contacting the area upon which the fungus is located with an effective amount of antifungal ingredient containing a compound of the group consisting of a 2-R-benzimidazole wherein R is a member of the group consisting of thiazolyl, isothiazolyl and thiadiazolyl, and acid addition salts thereof.

14. A method of controlling the growth of a fungus of the group consisting of Aspergillus species and Penicillium species which comprises contacting the area upon which the fungus is located with an effective amount of antifungal ingredient containing 2-(4'-thiazolyl) benzimidazole.

15. A method of controlling the growth of a fungus of the group consisting of Trichophyton species and Microsporum species which comprises contacting the area upon which the fungus is located with an effective amount of antifungal ingredient containing a compound of the group consisting of a 2-R-benzimidazole wherein R is a member of the group consisting of thiazolyl, isothiazolyl and thiadiazolyl, and acid addition salts thereof.

16. A method of controlling the growth of a fungus of the group consisting of *Cryptococeus neoformans, Hormodendrum pedrosoi, Microsporum audouini, Microsporum gypseum, Geotrichum* species, *Trichophyton gypseum, Trichophyton mentagrophytes*, and *Trichophyton rubrum* which comprises contacting the area upon which the fungus growth is to be controlled with an effective amount of antifungal ingredient containing a compound selected from the group consisting of a 2-R-benzimidazole wherein R is a member of the group consisting of thiazolyl, isothiazolyl and thiadiazolyl, and acid addition salts thereof.

17. A method according to claim 16 wherein the 2-R-benzimidazole is 2-(4'-thiazolyl) benzimidazole.

18. A method of controlling the growth of a fungus of the group consisting of *Rhizoctania solani, Fusarium solani, Altermaria solani,* and *Pythium ultimum* which comprises contacting the area upon which the fungus growth is to be controlled with an effective amount of antifungal ingredient containing a compound selected from the group consisting of a 2-R-benzimidazole wherein R is a member of the group consisting of thiazolyl, isothiazolyl and thiadiazolyl, and acid addition salts thereof.

19. A method according to claim 18 wherein the 2-R-benzimidazole is 2-(4'-thiazolyl) benzimidazole.

References Cited
UNITED STATES PATENTS
3,017,415  1/1962  Sarett et al. ———————— 260—302

FOREIGN PATENTS
1,117,000  11/1961  Germany.

LIONEL M. SHAPIRO, *Primary Examiner.*